US010533910B2

(12) United States Patent
Schoenfuss et al.

(10) Patent No.: US 10,533,910 B2
(45) Date of Patent: Jan. 14, 2020

(54) APPARATUS FOR MEASURING ACTUATION FORCE OF A PARKING BRAKE (71) Applicant: FORD GLOBAL TECHNOLOGIES, LLC, Dearborn, MI (US)

(72) Inventors: Steffen Schoenfuss, Odenthal (DE); Anel Podinovic, Cologne (DE); Reiner Schmid, Bergisch Gladbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/113,381

(22) Filed: Aug. 27, 2018

(65) Prior Publication Data
US 2019/0113409 A1    Apr. 18, 2019

(30) Foreign Application Priority Data

Oct. 12, 2017   (DE) .......................... 10 2017 218 257

(51) Int. Cl.
| G01L 5/00 | (2006.01) |
| G01L 5/22 | (2006.01) |
| B60T 17/22 | (2006.01) |
| B60T 7/10 | (2006.01) |
| G05G 25/00 | (2006.01) |
| G05G 1/04 | (2006.01) |

(52) U.S. Cl.
CPC ............... *G01L 5/22* (2013.01); *B60T 7/102* (2013.01); *B60T 17/221* (2013.01); *G05G 25/00* (2013.01); *G05G 1/04* (2013.01)

(58) Field of Classification Search
CPC .......... G01L 5/22; B60T 7/102; B60T 17/221; G05G 25/00; G05G 1/04

USPC ....................................... 73/862.541
See application file for complete search history.

(56) References Cited

U.S. PATENT DOCUMENTS

| 4,373,402 A | * | 2/1983 | Barrett | ................. G01L 1/2206 73/132 |
| 4,876,914 A | * | 10/1989 | Kanno | .................... B60T 7/105 74/538 |

(Continued)

FOREIGN PATENT DOCUMENTS

DE    102005031120 A1    2/2006

*Primary Examiner* — Max H Noori
(74) *Attorney, Agent, or Firm* — Raymond Coppiellie; Brooks Kushman P.C.

(57) ABSTRACT

Apparatus for measuring an amount of force required to apply a mechanical parking brake of a motor vehicle. The apparatus includes a body adapted for mounting to a parking brake lever of the type which is manually pivotable about an axis to apply a parking brake. First and second force sensors are disposed on the body at different distances from a pivot axis of the lever when the body is mounted to the lever. The force sensors measure force applied to a lower surface of the lever to cause the lever to pivot when the lever is pulled upward to apply the parking brake. An angle sensor is disposed on the body and measures an actuation angle through which the lever pivots about the pivot axis during application of the parking brake. An electronic unit reads respective first and second forces applied to the force sensors during pivoting of the lever, calculating therefrom an effective actuation force applied at a reference point on the lever, and associates the effective actuation force with the actuation angle.

10 Claims, 6 Drawing Sheets

(56) References Cited

U.S. PATENT DOCUMENTS

| | | | |
|---|---|---|---|
| 2005/0204855 A1* | 9/2005 | Fujiwara | B60T 7/042 74/512 |
| 2008/0223171 A1* | 9/2008 | Fujiwara | G01L 1/2237 74/512 |
| 2014/0224601 A1* | 8/2014 | Yamanaka | B60T 7/085 188/204 R |

* cited by examiner

APPARATUS FOR MEASURING ACTUATION FORCE OF A PARKING BRAKE

CROSS-REFERENCE TO RELATED APPLICATIONS

This application claims foreign priority benefits under 35 U.S.C. § 119(a)-(d) to DE Application 10 2017 218 257.1 filed Oct. 12, 2017, which is hereby incorporated by reference in its entirety.

TECHNICAL FIELD

The present invention concerns a method for determining a single effective actuation force at a reference point that is applied by a person to a brake lever pivotably supported about a lever pivot axis of a mechanical parking brake of a vehicle, in particular a motor vehicle, when operating the parking brake at a handle of the brake lever.

The present invention further concerns a related force measurement device, in particular a device for determining a single effective actuation force at a reference point that is applied by a person to a brake lever pivotably supported about a lever pivot axis of a mechanical parking brake of a vehicle, in particular a motor vehicle, when operating the parking brake at a handle of the brake lever.

BACKGROUND

The development and manufacture of mechanical parking brakes, which are operated by a person by means of a brake lever pivotably supported about a lever pivot axis, include inter alia the necessary testing of proper operation in relation to the vehicle. In particular, with tests of this type, meeting legal or regulatory requirements may be tested, which requirements, for example, may specify maximum operating forces to be applied to the brake lever necessary to achieve clamping force of the parking brake adequate to hold the vehicle securely on defined gradients or slopes.

To test said parking brake function, it is necessary to measure the actuation force applied to the brake lever by a person when operating the parking brake, for example by means of a force sensor. In this case, however, it has been shown that the actuation force applied by the person to the brake lever can be significantly influenced by several factors, including a) the person operating the brake lever, b) a geometrical arrangement determined by a certain application of the force sensor to the brake lever or the relative position thereof to the brake lever, c) the direction of action of the actuation force applied by the person to the brake lever, and d) their experience regarding the performance of the test method. Said factors have been found to result in measurement results regarding the actuation force applied to the brake lever by the person that are subject to large fluctuations, so that said measurement results may provide relatively imprecise evidence about the actuation force to be actually applied to the brake lever for an adequate clamping or braking effect of the parking brake that is brought about thereby. Therefore, such measurement methods may provide inadequate assessments when using conventional measurement system analyses to assess the measurement quality of a measurement method or system, in particular regarding the repeatability and reproducibility thereof.

There is therefore a need for a force measurement method and a force measurement device for a mechanical parking brake that simply, reliably and accurately measures or determines the actuation force applied to a brake lever when the parking brake is operated by a person, in order to achieve a significant improvement in both the repeatability and the reproducibility. In particular, the method and the device should also be able to be simply applied within a vehicle, i.e. with the parking brake already properly installed, thus the device should be made compact and manageable and so as to be fitted to an existing brake lever of the parking brake without high cost.

SUMMARY

Against this background, it is the object of the present invention to provide a method of this type and a device of this type.

It is to be noted that the features mentioned individually in the following description can be combined with each other in any technically sensible manner and demonstrate further embodiments of the invention. The description additionally characterizes and specifies the invention, in particular in connection with the figures.

As disclosed herein, a method for determining a single effective actuation force at a selected reference point, which is applied by a person to a brake lever pivotably supported about a lever pivot axis of a mechanical parking brake of a vehicle when operating the parking brake by means of a defined operating surface on a handle of the brake lever, the effective actuation force acting at the reference point is determined from at least two actuation force components acting orthogonally to the operating surface. Each operating force component is measured by at least one force sensor as a function of an actuation angle of the brake lever when the parking brake is operated by the person. Therefore, the disclosed method provides at least as many force sensors as actuation force components that are to be measured. Furthermore, according to the disclosed method, the at least two force sensors are disposed at different distances from the lever pivot axis, and so that in each case the actuation force components to be measured and that act orthogonally to the operating surface act on said force sensors when the parking brake is operated by the person.

In this case, the distance between the lever pivot axis and the respective force sensor means the length of the shortest connecting path between the lever pivot axis and the respective force sensor, for example to the (geometric) center point of the respective force sensor. The force sensors may be identically embodied, for example regarding the design, the operating principle, the dimensions thereof and similar. The force sensors need not be identical, however.

An effective force, i.e. the effective actuation force, means in the present context a force that brings about a change in position, i.e. pivoting of the brake lever about the lever pivot axis, and consequently is used to produce a torque relative to the lever pivot axis. A force of this type is thus always oriented perpendicularly to or orthogonally to a corresponding (real or imaginary) lever or torque arm that is pivotable about the lever pivot axis. Moreover, the direction of action of the effective actuation force in this context also always runs parallel to the pivotal plane of the brake lever that is defined by the pivotal movement of the brake lever.

In the context of the present invention, the actuation angle means a pivot angle of the brake lever in relation to the initial position thereof, in which the parking brake is not being operated, and therefore is not applied and does not bring about any braking effect. In the initial position thereof, the actuation angle of the brake lever of the parking brake has the value zero according to said definition.

In accordance with the disclosed method, the effective actuation force at the reference point is therefore not measured directly, but is determined indirectly or calculated, from the at least two actuation force components acting perpendicularly or orthogonally to the operating surface and that are measured by the respective force sensor. A significant advantage compared to the direct measurement by means of only one force sensor of the total applied actuation force is that the result of the effective actuation force determined according to the invention is subject to significantly smaller fluctuations, which can be caused for example by operating forces being exerted on the brake lever with different directions of force action in the event of multiple measurement runs with the same person or even with different persons. The actuation force components usually exerted by a hand or a finger of the operating person at different distances from the lever pivot axis, and acting perpendicularly or orthogonally to the operating surface, are detected in a significantly realistic manner by the at least two force sensors disposed at different distances from the lever pivot axis, and are used to detect or to determine the effective total actuation force at the reference point, which results in a significant improvement in the measurement accuracy.

Moreover, the disclosed method enables the determination of a suitable reference point in the context of a measurement method with high measurement quality (in particular regarding repeatability and reproducibility), which can also be referred to as a force reference point at which the effective actuation force determined according to the invention cannot be measured directly at all with conventional measurement means or force sensors, for example within the handle in the interior of the brake lever.

Accordingly, the disclosed method significantly reduces the influence of the person or persons operating the parking brake during implementation of the method. Fluctuations of the results are moreover significantly reduced, so that the method according to the invention allows qualitatively higher value conclusions for the development and manufacture of parking brakes of vehicles. Likewise, the method according to the invention can be used for quality testing of the proper adjustment of parking brakes following installation in the vehicle.

According to an advantageous embodiment of the invention, the at least two force sensors are disposed on the underside of the handle of the brake lever, on which respective actuation force components are exerted by means of a pad providing the operating surface when the parking brake is being operated by the person. The underside of the handle means the side of the handle that essentially faces the floor of the vehicle with the brake lever installed in the vehicle. In this way, the person can operate the brake lever in the usual way by applying an upwardly-directed, or "pulling" force to the underside of the handle. During this, pressure, pulling or bending forces act on the sensor depending on the respective known type of force sensor used that measure the force components according to the invention that are acting perpendicularly or orthogonally to the operating surface.

In a particularly advantageous manner, the pad can be disposed immediately near the brake lever, so that the operating movement of the person when carrying out the measurement method essentially corresponds to that of the completely usual operation of the parking brake. By contrast, a pad disposed at a greater distance from the brake lever results in an unusual operating movement that can significantly affect the measurement result. The larger the change in geometry caused by such a distance between the pad and the brake lever on the handle of the brake lever compared to a conventional brake lever geometry, the greater is also the unwanted influence on or error in the achievable measurement results that is to be expected with said brake lever geometry.

The force sensors for measuring the actuation force components acting orthogonally to the operating surface are preferably disposed between the inside of the pad facing the handle and the underside of the handle, so that a very small distance between the pad and the handle of the brake lever can be achieved.

It should also be understood that the operating surface is essentially defined by the pad, by means of which the person preferably applies the entire actuation force necessary for the operation of the parking brake to the handle of the brake lever. If said operating surface extends essentially perpendicularly to the pivotal plane defined by the pivotal movement of the brake lever, the actuation force components measured by the force sensors and acting orthogonally to the operating surface have directions of force action that extend in the pivotal plane or at least parallel to the pivotal plane.

According to a further advantageous embodiment disclosed herein, the effective actuation force at the reference point is determined from the measured actuation force components while taking into account the respective locations of the force sensors and the location of the reference point as a function of the current actuation angle, and from the location of the lever pivot axis relative to a reference coordinate system. In this connection, in a further preferred embodiment a coordinate origin of the reference coordinate system can be specified for the description of said locations and for determining the effective actuation force from the actuation force components in the pivotal plane of the brake lever, whereby an otherwise three-dimensional description of the locations can be reduced to a two-dimensional view to simplify the determination of the effective actuation force if all previously mentioned locations can be assumed to be essentially located in the pivotal plane of the brake lever, in particular for example the reference point of the effective actuation force that is to be determined has also been determined as essentially lying in the pivotal plane of the brake lever.

Yet another advantageous embodiment disclosed herein provides that the effective actuation force is determined at least for a static pivot angle of the brake lever. The static pivot angle means here the actuation angle of the brake lever that is determined by a stable static position of the brake lever, in which the brake lever can be secured or locked without continued exertion of the actuation force on the brake lever. According to the definition, the at least one static position of the brake lever is reached following actuation (pivoting upward) of the parking brake, and is consequently different from the aforementioned initial position of the brake lever, in which the actuation angle takes the value zero. The determination of at least one static position of the brake lever advantageously enables the determination of an effective actuation force associated with said static position and can for example be used as a uniquely defined comparison value for testing legal provisions and/or for a comparison of multiple parking brakes of the same design.

According to a further advantageous embodiment disclosed herein, securing or locking the brake lever in the at least one static position thereof is brought about by a ratchet and pawl arrangement. A ratchet and pawl arrangement of this type is well-known, wherein as a result of the operation of the parking brake by the person, i.e. as a result of a pivotal movement of the brake lever, a pawl and at least one ratchet of a ratchet ring are moved relative to each other in such a way that they hold or lock the brake lever in the at least one static position by interaction, i.e. they prevent the brake lever from pivoting back into initial position thereof. According to said embodiment, the ratchet and pawl arrangement passes beyond the static pivot angle that is determined by the at least one static position into the locking interaction that must be achieved for detection of the brake lever in the static position only after operation of the brake lever.

The present embodiment of the method according to the invention provides that during actuation of the parking brake at multiple different operating pivot angles, at each increment of pivot angle an effective actuation force is determined and stored, the brake lever is pivoted beyond the at least one static pivot angle until the ratchet and pawl arrangement passes into engagement for the static position associated with the static pivot angle, and then no actuation force components are exerted on the brake lever for a predictable static period, so that the brake lever adopts the static position thereof at the corresponding static pivot angle, and the effective actuation force is determined in the corresponding static position using the constant operating pivot angle that is determined within the static period that corresponds to the static pivot angle that was previously stored for said actuation angle. In other words, with said embodiment, reaching a defined static position of the brake lever is automatically detected and the effective actuation force in said static position at the corresponding static pivot angle is automatically determined from the previously recorded measurement values. The method according to the invention can thus be used to carry out force measurements on different types of parking brakes in a simple way and without a great deal of previous effort. For example, different types of parking brakes can have different numbers of defined static positions and/or different angular separations of static pivot angles between individual static positions.

The additional operating angle through which the brake lever must be operated beyond the actual static pivot angle until the ratchet and pawl arrangement passes into locking engagement for the corresponding static position of the brake lever can for example be about 0.2 to 0.5 degrees (angular difference).

The determination and storage of the effective operating forces at the different operating pivot angles during the operation of the brake lever are preferably carried out in such short time intervals (measuring intervals) that a sufficiently accurate determination of the effective actuation force at the static pivot angle in the static position of the brake lever is possible. The smaller said measuring interval is selected to be, the larger is the determination accuracy to be expected for the effective actuation force at the static pivot angle.

According to a further aspect disclosed herein, a device or apparatus for determining a single or effective actuation force at a reference point that is applied by a person during actuation of a brake lever, the lever being supported for pivoting movement about a pivot axis of a mechanical parking brake of a vehicle when operating the parking brake by means of a defined operating surface on a handle of the brake lever, comprises a body that can be attached to the handle of the brake lever. At least two force sensors are mounted on the body and are disposed spaced apart from one another such that said force sensors are at different distances from the lever pivot axis when the body is attached to the handle of the brake lever. An operating force component to be measured by said force sensors acts on said force sensors in each case orthogonally to the operating surface, and said at least two force components are used for determining the effective force when the parking brake is being operated by the person.

Regarding device-related terminology and the actions and advantages of features corresponding to the device, reference is hereby made to the previous descriptions of corresponding definitions, actions and advantages relating to the disclosed method. Disclosures herein relating to the measurement method according to the invention shall be able to be used in a corresponding manner for the definition of the measuring device according to the invention if this is not expressly excluded herein. Likewise, disclosures herein relating to the measuring device according to the invention shall be able to be used in a corresponding manner for the definition of the measurement method according to the invention if this is not expressly excluded herein. In this respect, repetition of descriptions of this type is omitted in favor of a more compact description.

According to an advantageous embodiment disclosed herein, the device further comprises a pad that is supported on the body and that is disposed on the underside of the brake lever handle when the body is attached to the brake lever. The pad is coupled to the force sensors in a force-transferring manner and provides the operating surface on which the actuation force components are exerted when the parking brake is actuated/operated. For a particularly smooth and proper transfer of force from a hand of the person operating the brake lever to the brake lever, the pad can preferably have a length that approximately corresponds to the width of an average human hand. During operation of the parking brake, the pad can thus be gripped well and uniformly.

Owing to the arrangement of the force sensors at different distances from the lever pivot axis, actuation force components that are unevenly distributed and acting on the pad over the length thereof orthogonally to the operating surface, and that consequently produce different torques on the brake lever because of different effective lever or torque arms relative to the lever pivot axis, can still be measured accurately, so that the effective actuation force at the reference point that is determined therefrom has no more than small fluctuations for different test measurements.

In a further particularly advantageous manner, the pad can be disposed in the immediate vicinity of the brake lever, so that the operating movement of the person when carrying out the previously described method according to the invention essentially corresponds to that of a completely usual movement for operation of the parking brake. The force sensors are preferably disposed between the inner side of the pad facing the handle and the underside of the lever handle, so that a very small distance between the pad and the handle of the brake lever can be achieved.

According to a further advantageous disclosed embodiment, the device further comprises an angle sensor operative to measure an actuation angle of the brake lever when the lever is pivoted to apply the parking brake. In principle, the angle sensor can be disposed at any point, for example on the pivot axis of the brake lever, if accurate detection of the operating pivot angle is guaranteed during the operation of the parking brake by the person, starting from the initial position (actuation angle equal to zero) of the brake lever.

According to yet another advantageous embodiment, the angle sensor is fixedly joined or attached to the body. In this way, a particularly compact design of the device for determining the effective actuation force can be achieved, which also only requires low cost for mounting on the brake lever. A device of this type is thus particularly suitable for carrying out a force measurement on a brake lever that is already installed in a vehicle.

In a further particularly preferred embodiment of the device, the angle sensor is operative to also measure a tilt angle about a longitudinal axis of the body in addition to the actuation angle of the brake lever. The longitudinal axis of the body is determined by the longitudinal extent thereof, wherein the body is advantageously essentially adapted to the shape of the handle of the brake lever. Accordingly, a particularly preferred form of the body is embodied to be essentially hollow cylindrical, conical or cup-shaped, so that the body can be stably mounted on the conventional essentially cylindrically-shaped brake lever handle. In this case, the longitudinal axis of the body essentially corresponds to the central axis of the corresponding hollow cylinder or cone.

By measuring the tilt angle about the longitudinal axis of the body, an exactly defined orientation of the body (or the entire device) relative to the brake lever handle in the peripheral direction thereof is possible. In this way, it can be ensured that when the device is mounted on the brake lever handle, the force sensor and/or the pad can always be disposed oriented relative to the brake lever so that the force sensor can always measure the entire actuation force components acting orthogonally to the operating surface, thus in particular those forces with directions of force action running parallel to the pivotal plane defined by the pivotal movement of the brake lever, and not forces or components of forces that are inclined relative to said pivotal plane (lateral forces/lateral force components), because said forces/lateral force components do not contribute to producing a torque on the brake lever about the lever pivot axis. An angle sensor embodied in this way can also be referred to as a three-dimensional angle sensor that can measure angles relative to at least two axes of rotation. The measurement and analysis of the tilt angle, for example before or during the force measurement, prevents an unfavorable application of the device for determining the effective actuation force to the brake lever resulting in an inaccurate force measurement, and thus further increases the measurement quality that can be achieved with the device according to the invention.

Yet another advantageous embodiment of the invention provides an electronic unit, in particular an electronic computing and memory unit that is operative to carry out applicable steps of a method in accordance with any one of the embodiments described herein. It is to be understood that depending on the specific embodiment of the method to be carried out for determining the effective actuation force, the electronic unit is electronically connected to corresponding force sensors and/or at least one corresponding angle sensor for transferring the respective measurement data for subsequent analysis.

Further features and advantages of the invention arise from the following description of an exemplary embodiment of the invention that is not to be considered to be limiting, which is described in detail below with reference to the drawing. In the figures:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the different figures, parts that are equivalent regarding the function thereof are always provided with the same reference characters, so that as a rule the same are also only described once.

Figure 1:
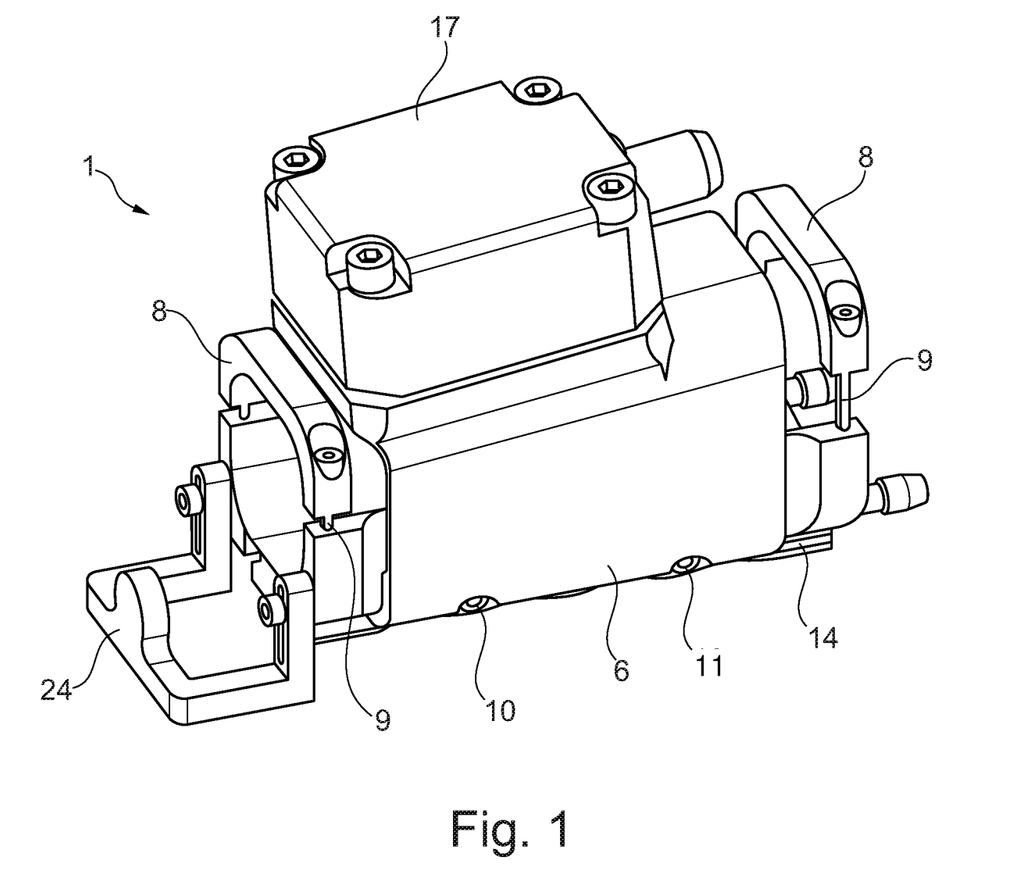
FIG. 1 shows schematically a perspective view of an exemplary embodiment of a device according to the invention.
Figure 2:
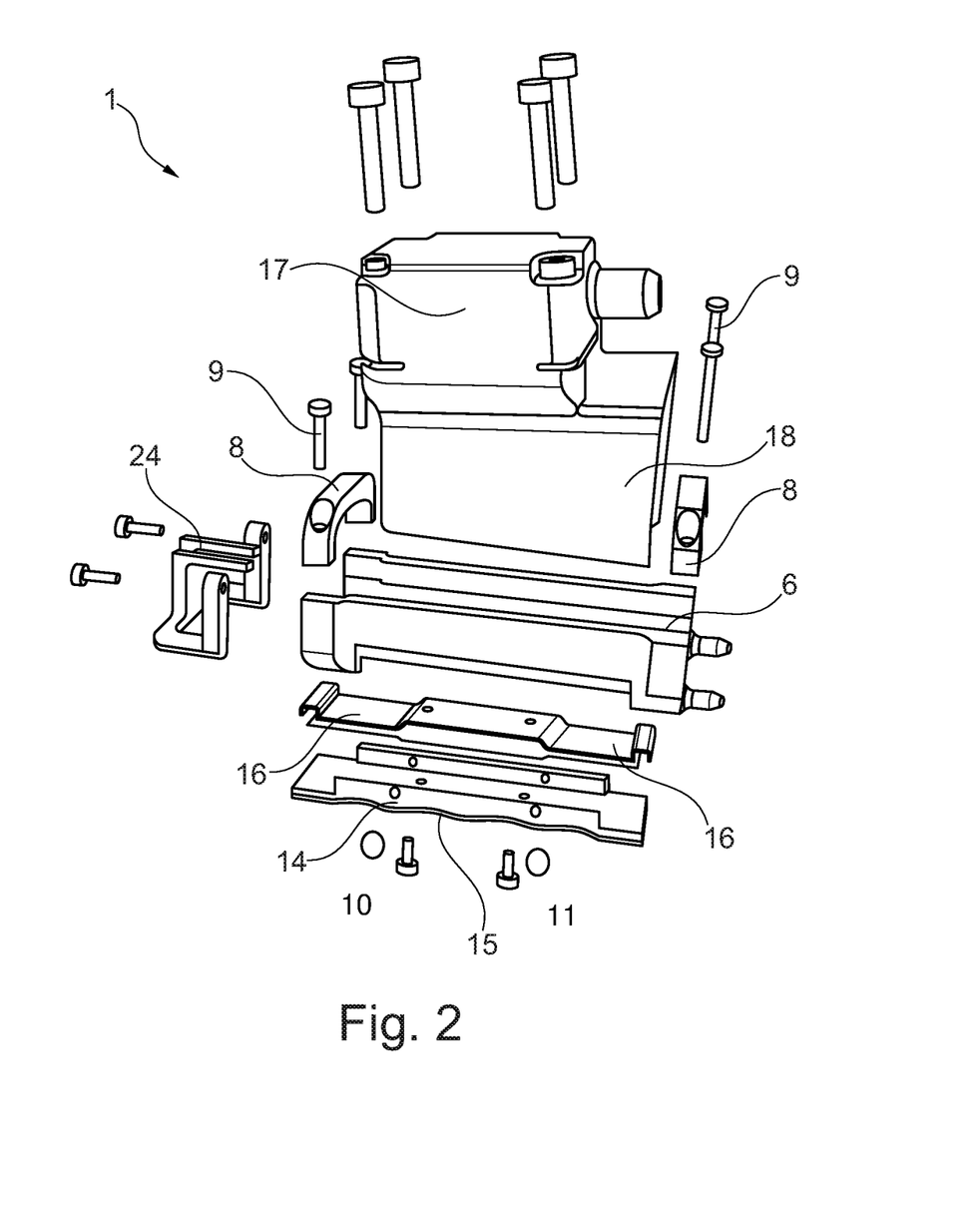
FIG. 2 shows schematically a perspective exploded view of the device from FIG. 1.
Figure 3:
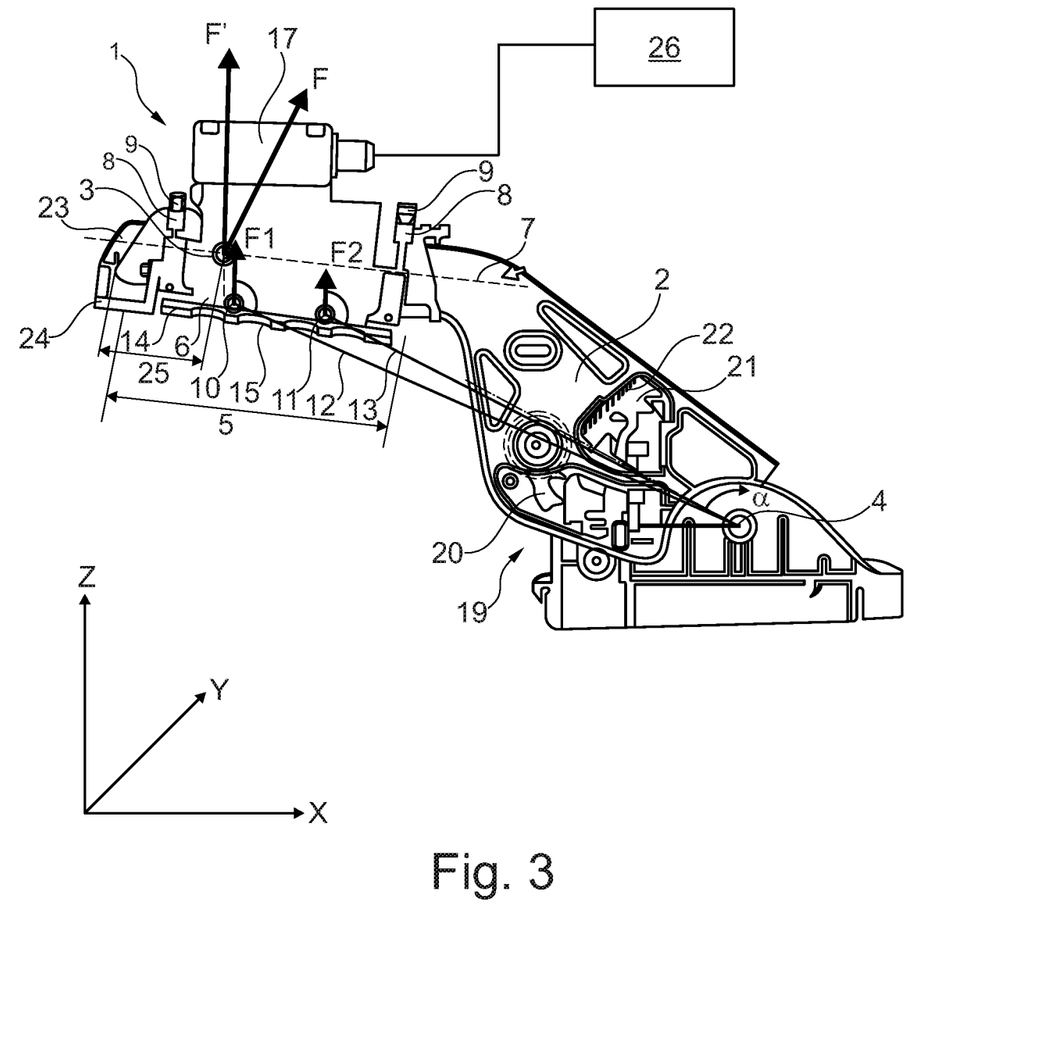
FIG. 3 shows schematically a side view the device from FIG. 1 attached to a brake lever of a mechanical parking brake of a vehicle.

FIGS. 1 through 3 are described together below. FIG. 1 shows a perspective view of an exemplary embodiment of a device 1 according to the invention, FIG. 2 shows a perspective exploded view of the device 1 of FIG. 1 and FIG. 3 shows a side view of an arrangement of a brake lever 2 of a parking brake that is not shown in detail in FIG. 3 of a vehicle (also not shown) and the device 1 of FIG. 1 attached to the brake lever 2. FIG. 3 shows the brake lever 2 by way of example in initial position thereof, in which an actuation angle α adopts the value zero.

The device 1 is used for determining a single, combined, or resultant effective actuation force F applied at a designated reference point 3, wherein the effective force F is that force required to be applied by a person (not shown) to actuate the brake lever 2 from a lowered position (corresponding to an OFF condition of the parking brake) to a raised position (corresponding to an ON or SET condition on the parking brake). As is commonly known in the prior art, the brake lever 2 is of the type that is supported for pivoting movement about a lever pivot axis 4 when operating the parking brake by pulling upward on a handle 5 of the brake lever 2. The handle 5 can mean the section or portion of the brake lever 2 which the person operating the brake usually grips the brake lever 2 with their hand in order to pull upwardly so as to pivot the lever about the axis 4 to apply the parking brake.

The device 1 comprises a body 6 that, as seen in FIG. 3, is attached to the handle 5 of the brake lever 2. The body 6 is preferably adapted to the shape of the handle 5 and in the case of the exemplary embodiment shown comprises an essentially half-cup or concave shape, as can be clearly seen in FIG. 2. As a result of the elongated extent thereof, the body 6 thus defines a longitudinal axis 7 (as shown in FIG. 3), which also essentially extends in the direction of the longitudinal extent of the handle 5 of the brake lever 2 when the body 6 is mounted thereto.

In the depicted exemplary embodiment of the device 1, the body 6 is operatively attached or mounted on the underside of the brake lever handle 5 and thus covers at least on the underside thereof. The device 1 can thereby be securely and stably held on the handle 5 of the brake lever 2.

For further fastening to the handle 5, the device 1 comprises front and rear mounting brackets 8 that overlap the top side of the handle 5 when the device 1 is mounted on the brake lever 2. The brackets can be reversibly joined to the body 6 by means of suitable connecting means, for example bolts 9. In this way, simple fixing of the device 1 to the brake lever handle 5 is enabled, which can also be adapted to differently shaped or sized handles 5 of different brake levers 2 (for example with different diameters of the handle 5 etc.) with little effort. In the disclosed embodiment, mounting brackets 8 and bolts 9 combine with the concave shape of body 6 where it contacts handle 5 to provide means for mounting the body to the handle.

As can also be seen from FIGS. 1 through 3, in the exemplary embodiment of the device 1 shown, two force sensors 10 and 11 are mounted on the body 6. The sensors 10, 11 may be embodied by a known strain gauge and may be essentially identical, in particular regarding the design thereof, the operating principle thereof and the dimensions thereof. This commonality is not absolutely necessary however. As can also be seen, the two force sensors 10, 11 are disposed spaced apart from each other along the longitudinal axis 7 such that the force sensors are located at different respective distances 12, 13 from the lever pivot axis 4 after attaching the body 6 to the handle 5. In particular in this case, the first or forward force sensor 10 is spaced apart from the second or rear force sensor 11 in the longitudinal direction of the body 6, i.e. along the longitudinal axis 7. The distance between the two force sensors 10, 11 is selected to be large enough to achieve sufficient separation of the two partial actuation force measurements to bring about a significant improvement in the measurement quality of the effective actuation force F at the reference point 3 that is determined or calculated therefrom. In the case of the exemplary embodiment of the device 1 shown, the distance between the two force sensors 10, 11 in the longitudinal direction 7 of the body 6 is preferably approximately 56.5 mm and can preferably be specified in a range between approximately 50 mm and approximately 60 mm. The two force sensors 10, 11 are disposed on the body 6 such that when a person is operating (pulling upward on) the parking brake lever, the sensors measure respective operating force components F1, F2, which force components are used to determine the effective actuation force F at the reference point 3.

The exemplary embodiment of the device 1 shown further comprises a pad 14 supported on the body 6 and providing an operating surface 15 and that is coupled to the force sensors 10, 11 in a force-transferring manner. Because the body 6 is disposed on the underside of the handle 5 after the attachment thereof to the brake lever 2, the pad 14 is suitably disposed on the underside of the handle 5 after mounting. When a person is operating the parking brake by pulling upward on the operating surface 15 with their fingers, the actuation force components F1, F2 measured by the respective force sensors 10, 11 are exerted on the pad 14. For an ergonomic transfer of force between a hand (not shown) and the pad 14, the operating surface 15 may advantageously comprise an undulating shape to define "finger grooves" for positioning suitable fingers of the hand operating the brake lever 2. This is not absolutely necessary, however.

Regardless of the undulating shape of the operating surface 15, the two force sensors 10, 11 are embodied and disposed to detect only the force components F1 and F2 acting essentially orthogonally to the operating surface 15, as is shown in FIG. 3. Only said forces F1, F2 oriented perpendicular to the operating surface 15 produce a torque on the brake lever 2 relative to the pivot axis 4 thereof. The two force sensors 10, 11 formed by the respective strain gauges are also correspondingly embodied to only measure the actuation force components F1, F2 acting on the force sensors 10, 11 perpendicularly or orthogonally to the operating surface 15.

In the exemplary embodiment of the device 1 shown, the force sensors 10, 11 are mounted on an intermediate plate 16 (see FIG. 2) inserted between an inner (upward- or handle-facing) side of the pad 14 and the underside of the handle 5, which forms or enables a force-transferring coupling between the pad 14 and the respective force sensors 10, 11, so that the actuation force components F1, F2 applied by the operating person to the device 1 or to the pad 14 by means of the operating surface 15 are transferred to the force sensor 10 or 11.

As can also be seen in FIGS. 1 through 3, the illustrated device 1 further comprises an angle sensor 17 operative to measure both the actuation angle $\alpha$ of the brake lever 2 when the parking brake is operated and a tilt angle of the device 1 about the longitudinal axis 7 of the body 6. The actuation angle $\alpha$ corresponds to an angle through which the lever 2 moves relative to the initial parking brake OFF position thereof. The actuation angle $\alpha$ is measured in the XZ-pivotal plane of the brake lever 2 defined by the pivotal movement of the brake lever 2 about the pivot axis 4. By contrast, the tilt angle of the device 1 is measured in the YZ plane and indicates an angular position of the device 1 in the peripheral direction of the handle 5 after mounting the device 1 on the brake lever 2. The angle sensor 17 can thus be referred to as a three-dimensional angle sensor, because it can measure at least two angles relative to different axes of rotation (here: the Y-axis for the actuation angle $\alpha$ or the X-axis for the tilt angle).

As can be seen in FIGS. 1 through 3, the angle sensor 17 of the device 1 shown is fixedly connected to the body 6 of the device 1 by means of an optional angle sensor mounting 18 that is in particular shown in FIG. 2. In particular, the angle sensor 17 of the device 1 is disposed diametrically opposite the force sensors 10, 11 or the pad 14 on the opposite side (top) of the body 6. The perpendicular orientation of the device 1 on the handle 5 can be checked in a particularly simple manner after assembly and/or even during a measurement process. Perpendicular orientation of the device 1 relative to the brake lever 2 means an orientation with which the force sensor 10, 11 is disposed essentially vertically below the handle 5, so that the full magnitude of the actuation force components F1, F2 applied perpendicular to the operating surface 15 of the pad 14 when operating the parking brake can be detected by the force sensors 10, 11, which, as already mentioned herein, only measure forces acting perpendicularly to the operating surface 15.

A well-known ratchet and pawl arrangement 19 can also be partially seen in FIG. 3, which essentially comprises a pawl 20 and a ratchet ring 21 with a plurality of ratchet teeth 22. As a result of the operation of the parking brake by the person, i.e. with increasing actuation angle $\alpha$ owing to the pivotal movement of the brake lever 2 (clockwise as viewed in FIG. 3), the pawl 20 and the ratchet teeth 22 of the ratchet ring 21 move relative to each other. That is, the pawl 20 moves together with the brake lever 2 and the ratchet ring 21 is at rest relative to the brake lever 2, and the ratchet and pawl arrangement engage in static positions ($\alpha>0$) of the brake lever 2 defined by the ratchet teeth 22 of the ratchet ring 21. In said static positions, the brake lever 2 is held or locked by the ratchet and pawl arrangement 19, even if no actuation force is being exerted on the brake lever 2 by the person operating the brake lever 2.

The brake lever 2 can be pivoted from a static position in the direction of increasing actuation angle $\alpha$ into a next static position at any time by re-application of a suitably large actuation force to the handle 5. Pivoting the brake lever 2 back downward (counter-clockwise, as viewed in FIG. 3) from a static position in the direction of decreasing actuation angle $\alpha$, i.e. towards the initial position ($\alpha=0$) of the brake lever 2, can however only take place after operation of a release button 23 that is accessible on the front end face of the brake lever 2. The release button 23 protrudes in the unactuated position thereof from the front end face of the brake lever 2, and to disengage the locking engagement of the ratchet and pawl arrangement 19 is pressed towards the rear end face of the brake lever 2 or along the longitudinal axis 7, which also corresponds to an axis of symmetry of the release button 23 for the brake lever 2 shown in FIG. 3.

For positive and accurate positioning of the device 1 on the brake lever 2, the device 1 may further comprise an end stop 24. In the exemplary embodiment of the device 1 shown, said end stop is mounted on the body 6 and is adjustable relative thereto in the height thereof, i.e. perpendicular to the longitudinal axis 7. In this way, the end stop 24 can be adjusted so that when mounted on the handle 5 it can come into contact with the point of the end face of the brake lever 2 extending the furthest forward from the handle 5 unhindered by the release button 23, so that the body 6 of the device 1 and hence also the force sensors 10, 11 are always and repeatably disposed in a precisely defined position relative to the handle 5.

In the example shown, the reference point 3 (also referred to as the force application reference point) selected for measurement of the single or resultant actuation force F is specified as lying at a distance 25 of approximately 40 mm along the longitudinal axis or the axis of symmetry 7 of the release button 23 from the point of the end face of the brake lever 2 at which the end stop 24 contacts the handle 5 after assembly of the device 1. This is not absolutely necessary, however and it may also be specified at other points.

FIG. 3 further shows an electronic unit 26, in particular an electronic computing (for example microprocessor) and memory unit, that is operative to carry out the relevant steps of the method described herein for determining the effective actuation force F. For this purpose, the electronic unit 26 is connected to both the force sensors 10, 11 and to the angle sensor 17 via suitable electrical connecting lines to receive the measurement values during a force and angle measurement and to analyze the same in the context of the present invention, in particular for example to determine the single effective actuation force F from the actuation force components F1 and F2. In the case of the exemplary embodiment shown in FIG. 3, the connecting line(s) make(s) the electrical connection between the control unit 26 and the device 1 via a suitable connector formed on the angle sensor 17.

Figure 4:
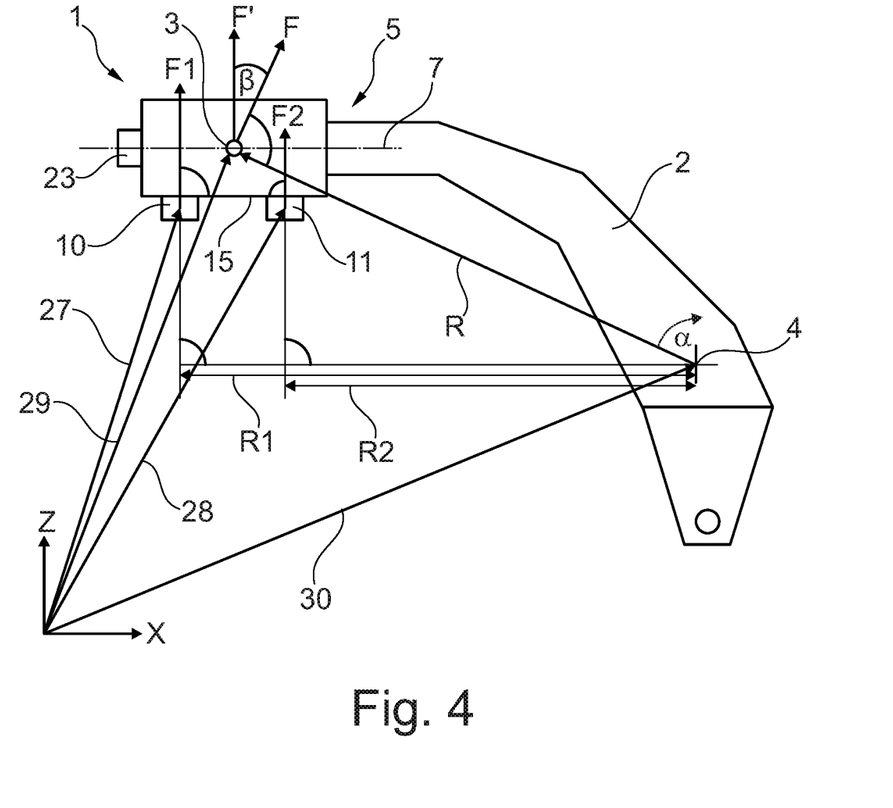
FIG. 4 shows schematically a side cross-sectional view of the arrangement of FIG. 3 along the central longitudinal plane thereof.

FIG. 4 shows schematically a highly simplified side cross-sectional view of the arrangement of FIG. 3 along the central longitudinal plane thereof, which corresponds here to the pivotal plane of the brake lever 2. FIG. 4 illustrates that the effective actuation force F at the reference point 3 is determined from the measured force components F1, F2 as a function of the current actuation angle $\alpha$ and from the location 30 of the lever pivot axis 4, while taking into account the respective positions 27, 28 of the force sensors 10, 11 and the location 29 of the reference point 3. In this case, the locations 27, 28, 29 and 30 are each to be understood as vectors starting from a coordinate origin of an X-Z reference coordinate system. Advantageously, in the case of the exemplary embodiment shown herein, said reference coordinate system is a two-dimensional coordinate system (y=0), because all locations 27, 28, 29 and 30 can be assumed to be located essentially in the pivotal plane of the brake lever 2.

Because of the accurate arrangement/positioning of the device 1 on the handle 5 of the brake lever 2 using the end stop 24 already described, even on brake levers of different designs, an accurate and positive position of the locations 27, 28 and 29 relative to each other and relative to the handle 5 of the brake lever 2 is always guaranteed.

The effective actuation force F acting at the reference point 3 can be determined by the use of suitable vector geometry and torque balancing from the actuation force components F1 and F2 acting orthogonally to the operating surface 15 and measured by the force sensors 10, 11 and the sole geometry information or locations 27, 28, 29 and 30, i.e. the locations of the first force sensor 10, the second force sensor 11, the reference point 3 and the lever pivot axis 4.

In a particularly advantageous manner, the geometry information, i.e. the locations 27, 28, 29 and 30, can be readily determined or read out from a CAD model of the arrangement of the brake lever 2 and the device 1.

From the torque balance applicable at each actuation angle $\alpha$ $$\Sigma M = 0$$

we get $$-F1*R1 - F2*R2 + F*R = 0$$

and further $$F = (F1*R1 - F2*R2)/R$$

wherein R1 corresponds to the length of the effective torque arm relative to the operating force component F1 measured by the force sensor 10 and acting orthogonally to the operating surface 15 (right angle between F1 and R1), R2 corresponds to the length of the effective torque arm relative to the operating force component F2 acting orthogonally to the operating surface 15 and measured by the force sensor 11 (right angle between F2 and R2) and R corresponds to the length of the effective torque arm relative to the effective actuation force F to be determined at the reference point 3 (right angle between F and R). The effective torque arm R is the shortest connection between the pivot axis 4 and the reference point 3. The respective lengths of the effective torque arms R1, R2 and R are all measured from the lever pivot axis 4.

It will be understood that further forces can be calculated from the previously determined effective actuation force F using the known vector geometry, thus for example the (maximum) total actuation force F' acting on the underside of the pad 14 or on the operating surface 15:

$$F' = F/\cos(\beta)$$

wherein $\beta$ corresponds to the angle enclosed by the direction of force action of the effective actuation force F with the direction of force action of the operating force component F1 or F2 acting orthogonally to the operating surface 15. Of course, forces in other directions of force action can also optionally be calculated, determining which is based on a calculation using the known locations 27, 28, 29 and 30.

Likewise, all further geometric intermediate variables required for the previous calculation, for example the distance between the two force sensors 10, 11, the lengths of the effective torque arms R1, R2 and R, the angle of inclination β etc., can be determined from the known locations 27, 28, 29 and 30 using the vector geometry.

Figure 5:
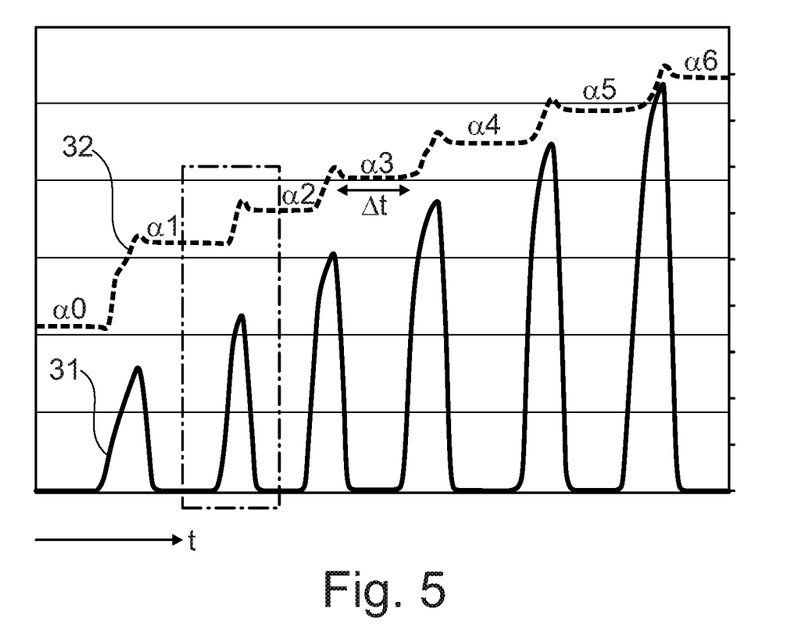
FIG. 5 shows schematically an actuation force profile against time and an actuation angle profile against time when carrying out an exemplary embodiment of a disclosed method.

FIG. 5 shows an actuation force profile 31 against time of the effective actuation force F determined for the reference point 3 and a corresponding actuation angle profile 32 against time of the operating pivot angle α detected by the angle sensor 17 when carrying out an exemplary embodiment of a method for determining the effective actuation force F according to the invention. The electronic unit 26 is operative to generate the relationships shown in FIG. 5 by associating the measurements or readings from of the effective actuation force F (from force sensors 10, 11) and the angle α (from angle sensor 17).

As can be seen from FIG. 5, in total six static positions or static pivot angles α1, α2, α3, α4, α5 and α6 are determined by the ratchet and pawl arrangement 19, wherein α0 corresponds to the initial position of the brake lever 2 (brake OFF) and hence adopts the value zero.

It can be seen from FIG. 5 that when carrying out the method according to the invention using the device 1, the brake lever 2 is initially carefully pulled upward from the initial position α0, i.e. in particular with a sufficiently low angular speed, until the brake lever 2 can be fixed, i.e. latched, in the first static position or at the first static pivot angle α1 by the ratchet and pawl arrangement 19. Once the brake lever 2 is latched in the first static position (static pivot angle α1), the person can release the brake lever 2, so that no upward actuation force is now being applied to the brake lever 2. The brake lever 2 is not operated for a static period Δt. Then the previous steps are repeated, so that the static positions of the remaining static pivot angles α2, α3, α4, α5 and α6 are reached in succession. At the last static position (static pivot angle α6), the movement of the brake lever 2 can be limited by a brake lever end stop or a maximum permissible actuation force can be achieved.

Figure 6:
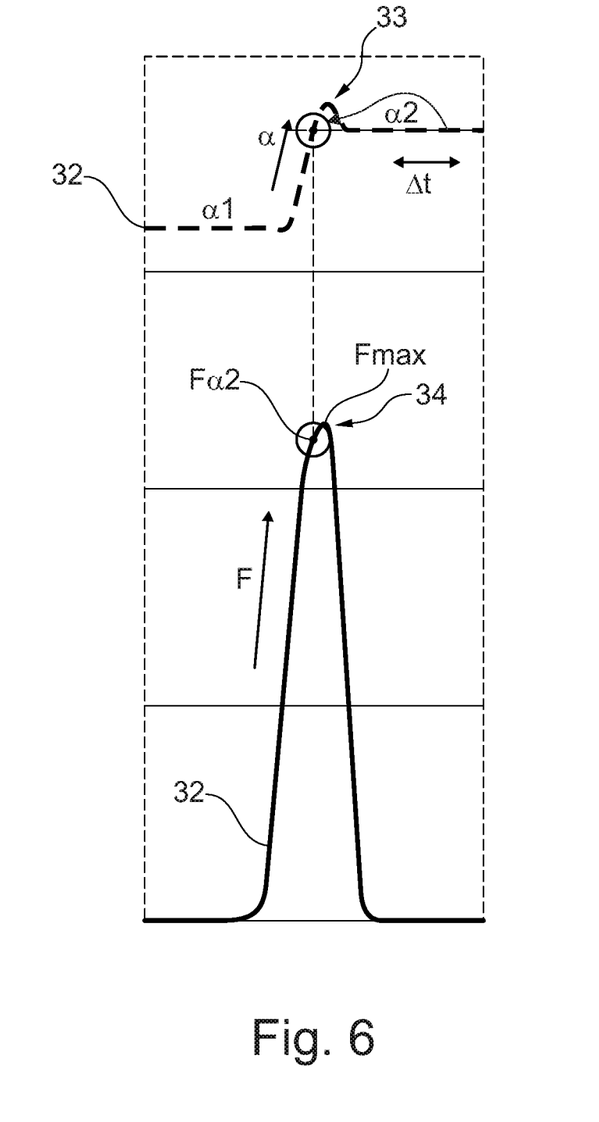
FIG. 6 shows schematically an enlarged sectional view from the curves of FIG. 5.

FIG. 6 shows an enlarged view of a section of the graph profiles 31 and 32 of the region in FIG. 5 bounded by a dashed line. It can be seen how the effective actuation force F also increases when pivoting the brake lever 2 from the static pivot angle α1 (first static position) to the static pivot angle α2 (second static position) with increasing operating angle α. As already described herein, the ratchet and pawl arrangement 19 does not pass directly into latching engagement on reaching the static pivot angle α2, but only after the brake lever 2 is pivoted slightly beyond said static pivot angle α2 by the person. Said necessary "overshoot" (additional operating angle) also requires a corresponding additional actuation force, whereby the maximum effective actuation force Fmax determined in the event of overshooting also exceeds the actual effective actuation force at the corresponding static pivot angle α2. The additional angle can for example be approximately 0.2 to 0.5 degrees. The overshoots of the operating pivot angle α and the actuation force F are denoted in FIG. 6 with the reference characters 33 and 34.

While carrying out the method shown, i.e. during the actuation (pivoting upward) of the brake lever 2 by the person, a plurality of actuation angles α measured over time are acquired and stored by the electronic unit 26. Likewise, the effective operating forces F determined at said operating pivot angles α are acquired and stored by the electronic unit 26. Following the overshoot by the brake lever 2 beyond the static pivot angle α2, the brake lever 2 is released for the static period Δt, so that the brake lever 2 moves back into the second latched static position and adopts the static pivot angle α2 there. It can be seen in FIG. 6 that the effective actuation force F returns to the value zero during said static period Δt.

As a result of the static period Δt, which can preferably last approximately 1 second (s) to 5 s, or more preferably approximately 2 s to 3 s, and in the case of the exemplary embodiment shown of the measurement method approximately 2 s, the electronic unit 26 detects a constant, invariant actuation angle α, which corresponds to the static pivot angle α2 here. From the previously stored effective force values F at the operating pivot angles α, the control unit 26 now determines the effective force value Fα2 associated with the previous first time of reaching the static pivot angle α2, as is made clear in FIG. 6. In this way, the exact effective actuation force F at the reference point 3 can be determined at the specified static pivot angle α2. The same procedure is used at all other static pivot angles α1-α6.

It should be noted at this point that when carrying out the previously described method for holding the vehicle at certain vehicle inclinations, the actuation angle overshoot 33 and the actuation force overshoot 34 should be less than a defined value, because the result of determining the effective actuation force F could otherwise be erroneous because of hysteresis effects of the parking brake. If for example the actuation force overshoot 34 is too large, when holding the vehicle at an angle the effective actuation force F as determined above is set as too low if the effective actuation force F (for example Fα2) determined in the respective latched static position (for example at α2) of the brake lever 2 is used. On the other hand, the effective actuation force determined for the latched static position would be set too high if the maximum determined effective actuation force Fmax relating to the corresponding static position during the actuation force overshoot 34 were to be used.

By using the device according to the invention described herein for determining the effective actuation force and the method described herein for determining the effective actuation force, in particular the following causes of error can be avoided in a particularly advantageous manner:

falsification of the measurement result by an actuation force that is not applied perpendicularly to the handle 5 of the brake lever 2 by the person operating the brake lever 2.

falsification of the measurement result as a result of distribution of the actuation force over the width of the hand of the operating person, which in particular can turn out to be different for different persons. For example, the operating force input can be carried out more by means of the front of the fingers or the rear of the fingers, which results in different effective lever or torque arms and consequently in different measured effective operating forces.

falsification of the measurement result because of a force overshoot to reach a latched static position of the brake lever if the maximum determined actuation force (Fmax) is used during this, which results in an actuation force that is set too large for the static position.

falsification of the measurement result because of a measuring device or the force sensor not being disposed perpendicular to the handle of the brake lever, because thereby additional lateral actuation force components arise that are not used for the effective operation of the brake lever. The actuation force F is consequently measured as too large.

falsification of the measurement result as a result of the arrangement of the measuring device and hence the force sensor too far forward or rearward on the handle of the brake lever, which also results in different effective lever or torque arms and hence in different measured actuation forces F.

The method according to the invention and the device according to the invention described above are not limited to the embodiment disclosed herein, but in each case also include further embodiments that act in the same way.

In a preferred embodiment, the device according to the invention is used to determine a single effective actuation force at a reference point when a person is operating a manually operated mechanical parking brake of a vehicle, in particular a motor vehicle, by means of a brake lever.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Apparatus comprising:
    a body adapted for mounting to a lever manually pivotable by a person about an axis to apply a parking brake of a motor vehicle;
    first and second force sensors disposed on the body respective at respective first and second distances from a pivot axis of the lever when the body is mounted to the lever, the force sensors operative to measure force applied to a lower surface of the lever to cause the lever to pivot;
    an angle sensor disposed on the body and operative to measure an actuation angle through which the lever pivots about the pivot axis during application of the parking brake; and
    an electronic unit operative to read respective first and second forces applied to the force sensors during pivoting of the lever, calculating therefrom an effective actuation force applied at a reference point on the lever, and associating the effective actuation force with the actuation angle.

2. The apparatus of claim 1, further comprising a pad supported on the body such that, when the body is mounted to the lever, the pad is disposed on an underside of the lever and is coupled in a force-transferring manner to the force sensors, the pad providing a surface on which the first and second force components are exerted to actuate the lever.

3. The apparatus of claim 1, wherein the angle sensor is further operative to measure a tilt angle about a longitudinal axis of the lever.

4. Apparatus comprising:
    a body having means for mounting to a lever pivotable about an axis to actuate a vehicle parking brake;
    first and second force sensors disposed on the body respective first and second distances from a pivot axis of the lever when the body is mounted to the lever; and
    an electronic unit operative to read respective first and second forces applied to the force sensors during actuation of the lever and calculate therefrom an effective actuation force applied at a reference point on the lever.

5. The apparatus of claim 4, further comprising a pad supported on the body and that, when the body is mounted to the lever, is disposed on an underside of the lever and is coupled in a force-transferring manner to the force sensors, the pad providing a surface on which the first and second force components are exerted to actuate the lever.

6. The apparatus of claim 4, further comprising an angle sensor operative to measure an actuation angle through which the lever moves about the pivot axis.

7. The apparatus of claim 6, wherein the angle sensor is further operative to measure a tilt angle about a longitudinal axis of the lever.

8. Apparatus comprising:
    a body attachable to a vehicle parking brake lever pivotable about an axis;
    first and second force sensors disposed on the body at respective first and second distances from the axis when attached to the lever;
    an angle sensor operative to measure an actuation angle through which the lever moves about the pivot axis and
    an electronic unit operative to read first and second force components applied to the respective force sensors to rotate/pivot the lever, calculate therefrom an effective actuation force applied at a reference point on the lever, and associate the effective actuation force with the actuation angle.

9. The apparatus of claim 8, further comprising a pad supported on the body and that, when the body is mounted to the lever, is disposed on an underside of the lever and is coupled in a force-transferring manner to the force sensors, the pad providing a surface on which the first and second force components are exerted to actuate the lever.

10. The apparatus of claim 8, wherein the angle sensor is further operative to measure a tilt angle about a longitudinal axis of the lever.

* * * * *